United States Patent Office 3,623,836
Patented Nov. 30, 1971

---

3,623,836
PROCEDURE FOR THE PREPARATION OF SODIUM PERBORATE MONOHYDRATE
Jose Luis Denaeyer and Willy Kegelart, Brussels, Belgium, assignors to Solvay & Cie, Brussels, Belgium
No Drawing. Filed July 16, 1969, Ser. No. 842,340
Claims priority, application Belgium, July 17, 1968, 61,080
Int. Cl. C01b *15/12*
U.S. Cl. 23—60                                    3 Claims

ABSTRACT OF THE DISCLOSURE

Monohydrated sodium perborate is prepared by dehydrating sodium perborate tetrahydrate continuously in a fluid bed dryer by the action of hot air which is at a temperature not lower than 180° C. Sodium perborate monohydrate thus product has excellent strength against attrition.

BACKGROUND OF THE INVENTION

This invention relates to a process for overdrying hydrated salts. More particularly, the present invention is concerned with a process for the production of monohydrated sodium perborate which comprises dehydrating tetrahydrated sodium perborate by means of hot air.

It is well known that sodium perborate is widely used for the preparation of washing powders. The commercial perborate used for this purpose generally comprises a tetrahydrated perborate of the formula $NaBO_3 \cdot 4H_2O$ or $NaBO_2 \cdot H_2O_2 \cdot 3H_2O$, which contains about 10% active oxygen. In certain special washing powders, a monohydrated perborate of the formula $NaBO_3 \cdot H_2O$ or $NaBO_2 \cdot H_2O_2$ comprising 15 to 16% active oxygen is preferred. The main advantages of the monohydrated compounds compared to the above tetrahydrated compound include a faster dissolution in water and a decrease in specific weight.

The most commonly employed process of producing monohydrated sodium perborate comprises the dehydration of the tetrahydrate by means of a flow of hot air, and the most appropriate technique for carrying out this step involves operating in a fluid bed drier, which has well known advantages, such as a uniform and regular temperature throughout the entire mass and rapid thermal exchange. The last mentioned advantages are particularly desirable when relatively unstable products such as the persalts are to be dehydrated.

Among the problems encountered in using sodium perborate monohydrate is that even though it is produced in the form of discrete particles or granules of the size generally desired in washing powders, the granules are often readily friable and crumble into dust easily. This is a serious disadvantage in the handling and packaging of these materials particularly when they are to be handled by pneumatic means.

During investigations of batchwise operations, it has been observed that by introducing the fluidizing air at various temperatures between 90 and 140° C., the resultant monohydrated perborate is resistant to attrition or crumbling.

SUMMARY OF THE INVENTION

An object of the present invention is the provision of a process for continuously dehydrating sodium perborate tetrahydrate to yield sodium perborate monohydrate having desirable properties.

A further object of the persent invention is the provision of a continuous process for obtaining sodium perborate monohydrate which is resistant to attrition, i.e. resistant to wear or friction and not readily friable, by the dehydration of sodium borate tetrahydrate.

It has been discovered that in carrying out the dehydration of sodium perborate tetrahydrate continuously the strength or stability of the granules of the sodium perborate monohydrate product against attrition is dependent on the temperature of the air feed to the fluid bed. The temperature range which gives favorable results when operating batchwise, produces crumbly monohydrated perborates when operating continuously, and it has been found unexpectedly that monohydrated perborate granules which are highly resistant to attrition are obtained when operating continuously in a fluid bed drier in which the air fed to the apparatus is at a higher temperature than that normally used for batch operations.

Consequently, the process according to the invention for producing monohydrated sodium perborate by dehydrating tetrahydrated perborate in a fluid bed drier comprises carrying out the dehydrating step continuously by means of air which has been heated to a temperature of at least 180° C.

DESCRIPTION OF THE PREFERRED EMBODIMENTS

Preferably, the drier is fed with air which is heated to a temperature between 180 and 210° C. It has been observed that by raising the temperature of the fluidizing air, the strength of the granules, i.e. their resistance to attrition is improved, but on the other hand, the tendency of monohydrated sodium perborate to form crusts) average diameter greater than 1 mm.) at the outlet of the drier is increased proportionately. It is desirable that the quantity of crust be lower than 5–10% by weight; a higher proportion of crusting usually results when the temperature of the hot air is above 210° C.

The tetrahydrated perborate which is fed to the fluid bed may be a dry tetrahydrated perborate or the product directly obtained from hydrogen peroxide and sodium metaborate from which water has been squeezed out.

EXAMPLES

In a first series of dehydrations carried out on laboratory scale, the drier is a cylinder having a diameter of 15 cm. and a height of 1 m., and is provided at its base with a glass tissue which assures a good distribution of the air in the fluidized bed; the tetrahydrated perborate is introduced through an orifice located at the top of the cylinder, while the monohydrated perborate is executed by means of a lateral pipe located 32 cm. above the bottom. The reaction is carried out by using an air speed, in the drier, of between 16 and 32 cm./sec. and the flow of tetrahydrate introduced into the drier is regulated so as to maintain the temperature of the fluidized bed at a value which is substantially constant (56.7 to 58.6° C.) with the result that a monohydrated perborate which contains at least 15 to 15.2% active oxygen is produced.

In a second series of dehydration carried out in a pilot plant, there is used a cylindrical drier having a diameter of 75 cm. and a useful height of 30 cm. (distance between the bottom of the cylinder and the tube for evacuating the monohydrate). The tests were carried out with a flow of air of 417 m.³ N/h., corresponding to an air speed, in the bed, of 32 to 34 cm./sec.

The results are given in the following table.

| Perborate | Temperature of air introduced in ° C. | Attrition index percent Fluid bed drier laboratory | Fluid bed drier pilot | Crusts content, kg./ton of monohydrate |
|---|---|---|---|---|
| Tetrahydrated | | 3 | 5 | |
| Monohydrated | 140 | 18 | 14 | <10 |
| | 163 | ---------- | 12 | ≤10 |
| | 200 | 7 | 7 | 15 |
| | 210 | ---------- | 6 | 60 |
| | 250 | 5 | ---------- | >100 |

In this table, the values of the attrition indexes are given by the following test, which permits a measurement of the strength against attrition i.e. the stability of the granules toward crumbling.

In a small rotary drum having a length of 12 cm. and an inner diameter of 5.7 cm., there are introduced 50 g. of a perborate in which the particles have been sieved to a size smaller than 0.210 mm., and 200 g. of lead balls each having a diameter of 6 mm.

The drum which rotates about a horizontal axis at a speed of 140 r.p.m. is maintained in rotation for 15 minutes.

In a conventional manner, the attrition index is defined as being equal to twice the weight, expressed in g. of the material which at the end of the test passes through a sieve in which the openings have a diameter of 0.053 mm. It is defined in percent.

The products considered good with respect to the granules so that they may be incorporated in the washing powders are those in which the attrition index is lower or equal to 10%.

What we claim and desire to secure by Letters Patent is:

1. In a continuous process for producing monohydrated sodium perborate by dehydration of tetrahydrated sodium perborate wherein heated air is continuously introduced at the bottom of a fluidized bed drier, tetrahydrated sodium perborate is continuously introduced at the top of the drier and monohydrated sodium perborate is continuously evacuated at an intermediate level, an improvement whereby the attrition resistance of said monohydrated sodium perborate is increased which comprises introducing into the dried air heated to a temperature comprised between 180 and about 210° C.

2. Process according to claim 1, wherein the tetrahydrated sodium perborate introduced into the fluid bed drier is the squeezed product obtained by reaction between hydrogen peroxide and sodium metaborate.

3. Processing according to claim 1 wherein the temperature in the fluid bed is maintained substantially constant at about 56.7 to 58.6° C.

References Cited

UNITED STATES PATENTS 3,421,842  1/1969  Darbee et al.  _____ 23—60

FOREIGN PATENTS 562,432  8/1958  Canada  _____ 23—60

HERBERT T. CARTER, Primary Examiner